United States Patent [19]
Kukes et al.

[11] Patent Number: 5,266,188
[45] Date of Patent: Nov. 30, 1993

[54] SELECTIVE HYDROTREATING

[75] Inventors: Simon G. Kukes, Naperville; P. Donald Hopkins, St. Charles; Riitta L. A. Ollendorff, Wilmette; Pablo D. Hendler, Chicago; Cynthia D. Ontiveros, West Chicago; Don M. Washecheck, Naperville, all of Ill.

[73] Assignee: Amoco Corporation, Chicago, Ill.

[21] Appl. No.: 803,131

[22] Filed: Dec. 5, 1991

Related U.S. Application Data

[63] Continuation-in-part of Ser. No. 689,191, Apr. 22, 1991, abandoned.

[51] Int. Cl.$^5$ .............................................. C10G 23/02
[52] U.S. Cl. .................... 208/216 R; 208/217; 208/213; 208/215
[58] Field of Search ..................................... 208/216 R

[56] References Cited

U.S. PATENT DOCUMENTS

| | | | |
|---|---|---|---|
| 2,636,843 | 4/1953 | Arnold et al. | 196/31 |
| 3,957,625 | 5/1976 | Orkin | 208/211 |
| 4,140,626 | 2/1979 | Bertolacini et al. | 208/216 R |
| 4,334,982 | 6/1982 | Jacquin et al. | 208/216 R |

*Primary Examiner*—Helane Myers
*Attorney, Agent, or Firm*—Thomas A. Yassen; Richard A. Kretchmer

[57] ABSTRACT

A process, catalyst, and method of making a catalyst are provided for the selective hydrotreating of a selective hydrotreating feedstock comprising reacting the feedstock with hydrogen at hydrotreating conditions in the presence of a catalyst comprising a hydrogenation component and a support component. The hydrogenation component comprises a Group VIB metal component and a Group VIII metal component wherein the Group VIB metal component is present in an amount ranging from about 4 wt % to about 20 wt % and the Group VIII metal component is present in an amount ranging from about 0.5 wt % to about 10 wt %, both calculated as oxides and based on the total catalyst weight. The support component comprises from about 0.5 wt % to about 50 wt % of a magnesium component and from about 0.02 wt % to about 10 wt % of an alkali metal component, both calculated as oxides and based on the total catalyst weight. The present invention provides a process, catalyst, and method of making a catalyst resulting in higher selective hydrotreating feedstock octane at high levels of desulfurization, among numerous other benefits.

26 Claims, 2 Drawing Sheets

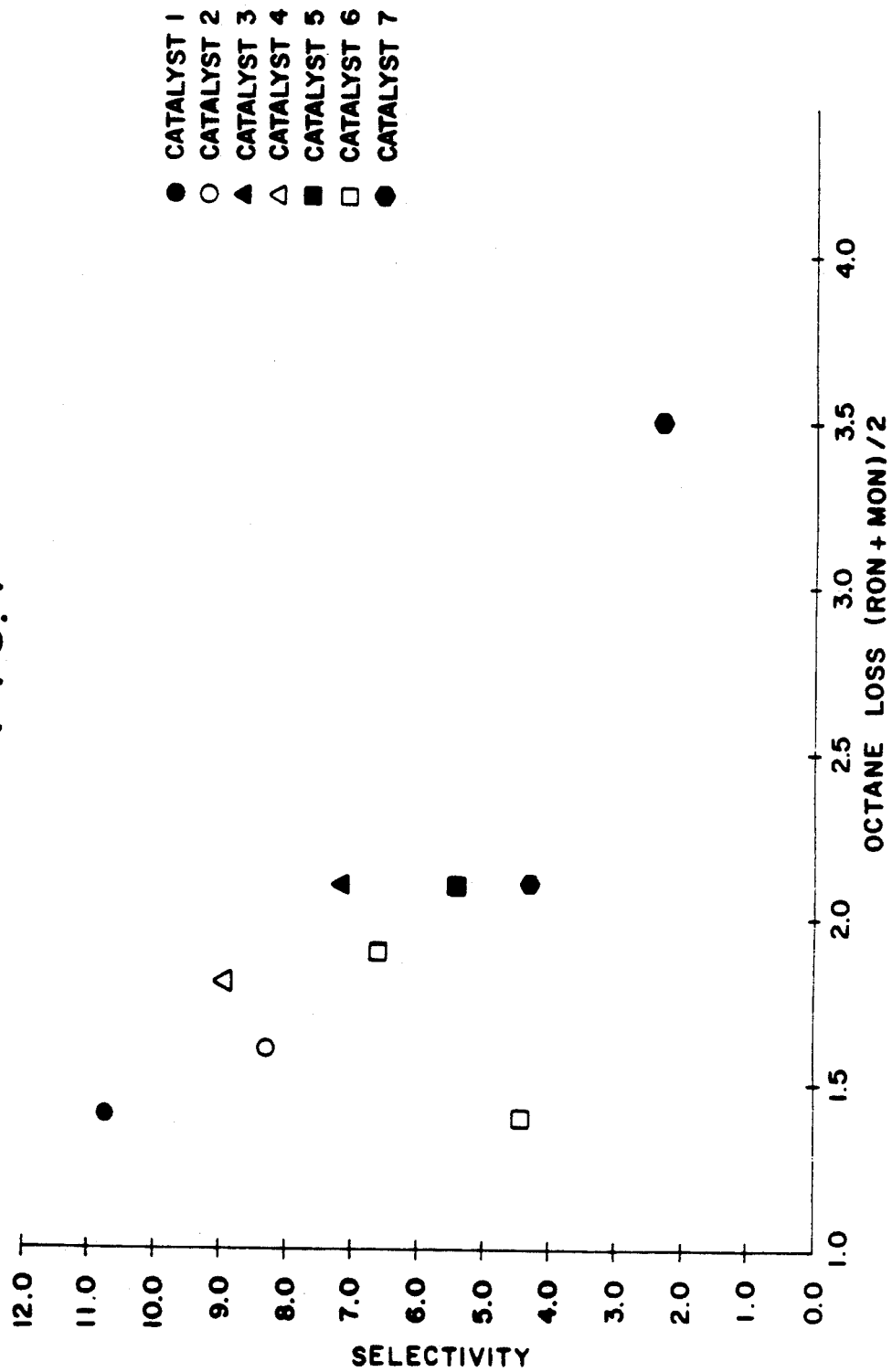

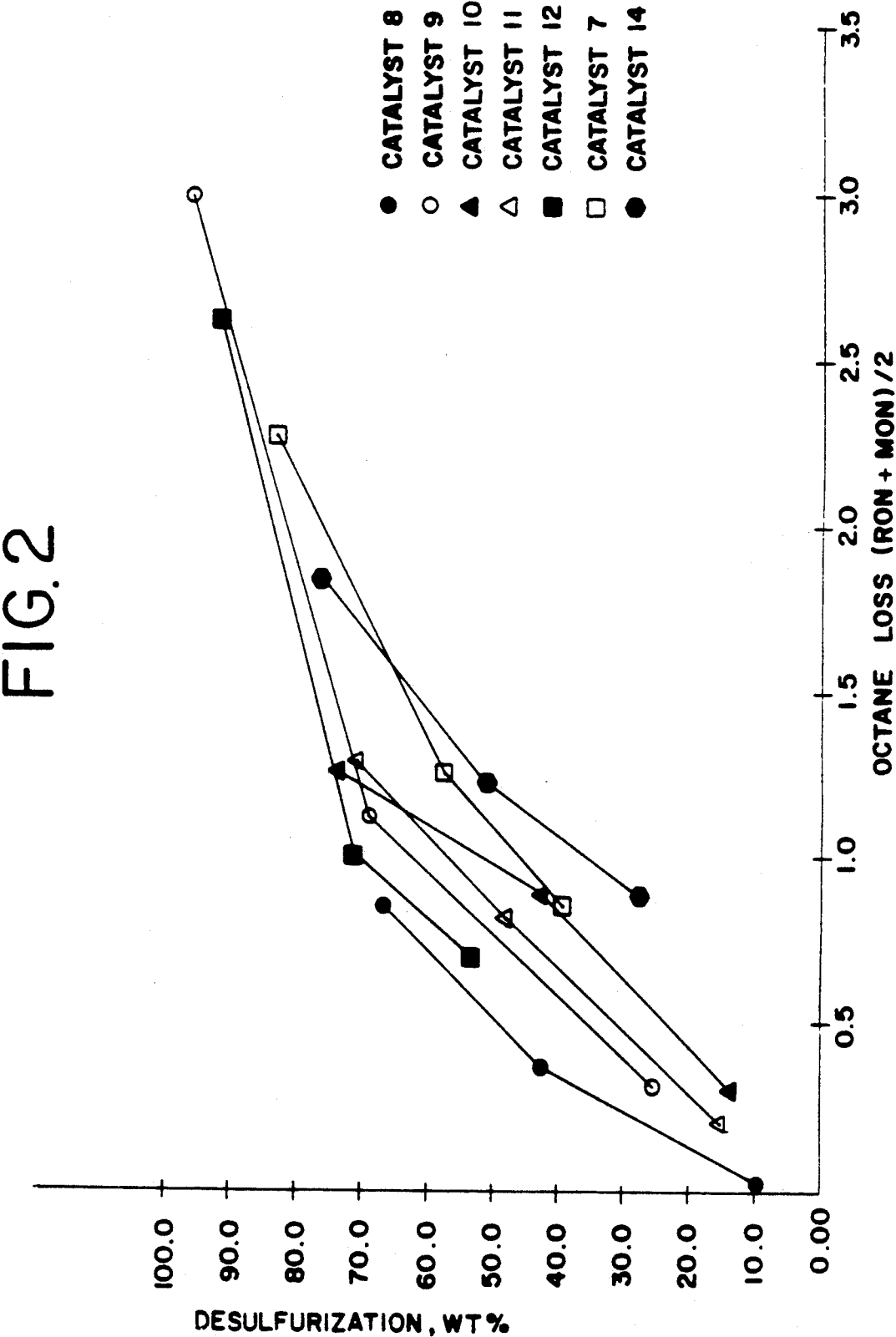

SELECTIVE HYDROTREATING

This application is a continuation-in-part of U.S. Ser. No. 07/689,191, filed on Apr. 22, 1991 now abandoned, the teachings of which are incorporated by reference.

BACKGROUND OF THE INVENTION

This invention relates to a process, catalyst, and a method for making a catalyst for the selective hydrotreating of hydrocarbons. More particularly, this invention relates to a process, catalyst, and method for making a catalyst for the selective hydrotreating of cracked naphtha using a catalyst comprising a Group VIB metal component, a Group VIII metal component, a magnesium component, and an alkali metal component.

Cracked naphtha is a blending component commonly used in refinery gasoline pools containing both sulfur and olefinic compounds. Cracked naphtha can be produced in refinery fluid catalytic cracking processes, coking processes, or hydrocracking processes, among others, where a gasoline boiling range component is generated or distilled having olefinic compounds. The sulfur, which can be present in cracked naphtha in amounts ranging up to 1.0 percent by weight, is both a potential air pollutant and a poison to the catalysts used in certain automobile catalytic converters. The olefinic compounds, which can be present in cracked naphtha in an amount ranging up to 60 percent by weight, have octane numbers that are generally higher than those of their corresponding saturates, and as such, it is generally undesirable to saturate olefins to saturates wherein the component stream is to be blended directly to gasoline.

Sulfur dioxide that is generated by the burning of high sulfur fuels (in the gasoline, distillate, and residual boiling point range) has been identified as one of the chief air pollutants. Hydrotreating is an important method for producing fuels with relatively low sulfur concentrations and commercial hydrotreating plants for treating fuel oils are now, and have been in operation to provide fuel oils that have legally acceptable sulfur levels. However, the Clean Air Act of 1990 has now mandated that Volatile Organic Compound (VOC) and Toxic Emissions be reduced by an additional 15% by the year 1995 and 25% by the year 2000, in ozone nonattainment areas, through fuel reformulation. It is likely that a considerable portion of this reduction will be performed through further reduction in the sulfur content of gasoline. Since gasoline production can comprise in excess of 50 wt % of the production output of a refinery, refinery hydrotreating loads can be expected to increase dramatically.

Therefore, if the cracked naphtha is to be desulfurized without eliminating or seriously reducing the amount of olefins that are present therein, the hydrotreating process that is used must be very selective, i.e., capable of removing substantially all of the sulfur without severely saturating the olefins that are present. Currently, there are several hydrotreating catalysts and processes that find considerable use in the petroleum refining industry. Such hydrotreating catalysts include cobalt and molybdenum and their compounds on a suitable support, cobalt, molybdenum, and nickel on a suitable support, nickel and tungsten and compounds thereof on a suitable support, and nickel and molybdenum and compounds thereof on a suitable support. The support, in general, is a weakly-acidic catalytically active alumina. Such conventional hydrotreating catalysts are less selective and not only remove sulfur from the petroleum hydrocarbon stream being treated, but also tend to saturate olefins, reducing the octane of the petroleum hydrocarbon stream.

Selective hydrotreating has been the subject of several U.S. patents, each meeting with varying degrees of success and limitations.

U.S. Pat. No. 4,334,982 to Jacquin et al. discloses a process for hydrotreating hydrocarbon streams having high olefin content with a low surface area hydrotreating catalyst comprising cobalt and tungsten or molybdenum. The total weight of cobalt, tungsten, and molybdenum, expressed as oxides, is from 2% to 30% by weight of the total hydrotreating catalyst, and the atomic ratio of cobalt to cobalt, molybdenum, and tungsten is greater than 0.55. The catalyst does not contain, nor does the patent teach or suggest use of a magnesium component.

U.S. Pat. No. 4,140,626 to Bertolacini et al. discloses a process for the hydrotreating of cracked naphtha with a catalyst comprising Group VIB and Group VIII metals deposed on a support comprising at least 70% by weight magnesium oxide. While magnesium oxide supported catalysts are effective hydrotreating catalysts, catalysts having a substantial amount of magnesium oxide can be relatively soft and have a low surface area. Hydrotreating catalysts having relatively low crushing strength and that incur high abrasion losses are less durable and generally less attractive for use in petroleum refinery operations.

U.S. Pat. No. 3,957,625 to Orkin discloses a process for the hydrotreating of a cracked naphtha stream wherein the cracked naphtha is split into low and high boiling naphtha fractions. The high boiling fraction is contacted with a low surface area hydrotreating catalyst comprising a cobalt-molybdenum-alumina catalyst having a promoter component consisting of barium, magnesium, cadmium, or a rare earth metal. The catalyst does not contain, nor does the patent teach or suggest use of an alkali metal component. The hydrotreated high boiling naphtha fraction is subsequently recombined with the low boiling naphtha fraction, and a gasoline blending component having a lower sulfur content is produced.

It has now been found that combining a Group VIB and Group VIII metal with a non-acidic support having a magnesium component and an alkali metal, in the manner described in the present invention, can provide superior catalyst and process performance. This is believed to be true since cracked naphtha hydrotreating selectivity appears to correlate inversely to catalyst acidity. While it is known that large amounts of a magnesium component can increase basicity, the resultant loss in catalyst durability can make the use of a catalyst having large concentrations of magnesium economically and operationally impracticable. It has now been found that the magnesium concentration in a selective hydrotreating catalyst can be substantially reduced when combined with an alkali metal in the manner described in the present invention. Moreover, it has also been found that a selective hydrotreating catalyst with both magnesium and an alkali metal provides superior performance to catalysts having either component separately.

It has also been found that the above described catalyst and processes utilizing the same can be further enhanced by the particular method of making the selective hydrotreating catalyst. Impregnation of the support with the Group VIB and Group VIII metals and coextrusion prior to post impregnation of the catalyst with the magnesium component and the alkali metal provides superior performance to other methods of making the catalyst of the present invention and to prior art catalysts in general.

It is therefore an object of the present invention to provide a process and catalyst that provide substantial cracked naphtha desulfurization while minimizing subsequent octane reduction.

It is another object of the present invention to provide a process and catalyst that reduce cracked naphtha diene concentration.

It is another object of the present invention to provide a process and catalyst that improve gasoline color and stability.

It is another object of the present invention to provide a catalyst that has superior crush strength and resists abrasion losses.

It is yet another object of the present invention to provide a method of making a catalyst and a process for utilizing a catalyst produced by this method that further enhance selective hydrotreating performance.

Other objects appear hereinafter.

SUMMARY OF THE INVENTION

The above objects can be attained by providing a process for the selective hydrotreating of a selective hydrotreating feedstock comprising reacting the feedstock with hydrogen at hydrotreating conditions in the presence of a catalyst comprising a hydrogenation component and a support component. The hydrogenation component comprises a Group VIB metal component and a Group VIII metal component wherein the Group VIB metal component is present in an amount ranging from about 4 wt % to about 20 wt % and the Group VIII metal component is present in an amount ranging from about 0.5 wt % to about 10 wt %, both calculated as oxides and based on the total catalyst weight. The support component comprises from about 0.5 wt % to about 50 wt % of a magnesium component and from about 0.02 wt % to about 10 wt % of an alkali metal component, both calculated as oxides and based on the total catalyst weight.

In another embodiment, a selective hydrotreating catalyst is provided comprising a hydrogenation component and a support component. The hydrogenation component comprises a molybdenum component and a cobalt component wherein the molybdenum component is present in an amount ranging from about 4 wt % to about 10 wt % and the cobalt component is present in an amount ranging from about 0.5 wt % to about 3 wt %, both calculated as oxides and based on the total catalyst weight. The support component comprises from about 0.5 wt % to about 50 wt % of a magnesium component and from about 0.02 wt % to about 10 wt % of a sodium component, both calculated as oxides and based on the total catalyst weight. The cracked naphtha hydrotreating catalyst has a surface area of at least 150 m²/gm.

In still another embodiment, a method for preparing a selective hydrotreating catalyst and a process for utilizing a selective hydrotreating catalyst prepared by this method, suitable for hydrotreating cracked naphtha, is provided comprising the steps of preparing a first aqueous composition comprising dissolved Group VIB and Group VIII metal compounds, mixing the first aqueous composition with a refractory inorganic oxide to form a paste comprising Group VIB and Group VIII metals, and converting the paste into particulates in the form of pills, powder, pellets, or extrudates. A second aqueous composition comprising dissolved magnesium and alkali metal components is then prepared and combined with the particulate to produce an aqueous particulate. The aqueous particulate is then calcined to produce the selective hydrotreating catalyst.

The processes, catalyst, and methods of the present invention can be utilized to provide substantial desulfurization of cracked naphtha to product sulfur levels below 0.1 wt %. Since cracked naphtha can contain high sulfur concentrations and further comprises a large volume percentage of the gasoline pool, most notably the regular grades, substantial desulfurization of cracked naphtha can make a large impact in the reducing of the sulfur concentration of the overall gasoline pool.

The processes, catalyst, and method of the present invention provide substantial desulfurization of cracked naphtha while minimizing olefin saturation and subsequent octane loss. High olefin saturation and octane loss can result in higher cost gasoline by requiring increased blending of octane-enhancing components such as toluene to gasoline and less than optimum refinery operating conditions to supplement lost gasoline pool octane.

The processes, catalyst, and method of the present invention provide substantial saturation of diene components to mono-olefins. In this manner, the process and catalyst of the present invention can be utilized upstream of naphtha isomerization reactors such as those utilized in normal pentane and normal hexane isomerization processes where dienes can polymerize and form coke on the isomerization catalyst.

The processes, catalyst, and method of the present invention provide improved gasoline color and stability. Improved gasoline color is particularly important in regions where gasoline is marketed as "water white" or undyed.

The catalyst of the present invention is more durable than higher selectivity prior art catalysts utilizing a substantial amount of magnesium. The catalyst of the present invention has a high crushing strength and incurs low abrasion losses. Improved catalyst durability can reduce catalyst replacement costs.

The method of catalyst preparation and processes for using catalysts prepared from this method provide reduced cracked naphtha octane loss at comparable desulfurization levels than catalysts having similar compositions but prepared utilizing other techniques. Other benefits of the present invention are described hereunder.

BRIEF DESCRIPTION OF THE DRAWING

FIG. 1 is a graph illustrating the relationship between desulfurization to olefin saturation selectivity and octane loss for a cracked naphtha stream using processes and catalysts in and not in accordance with the present invention.

FIG. 2 is a graph illustrating the relationship between desulfurization level and octane loss for a cracked naphtha stream using catalysts prepared utilizing methods in and not in accordance with the present invention.

BRIEF DESCRIPTION OF THE INVENTION

The selective hydrotreating feedstock processed in the present invention can comprise any one, several, or all refinery streams boiling in a range from about 50° F. to about 450° F. and more preferably between about 150° F. and 450° F. at atmospheric pressure. Hydrocarbon boiling below the selective hydrotreating feedstock boiling range are of limited use in the gasoline pool since they can prohibitively increase the volatility of the gasoline blending component, and in other cases, be recovered and directed to more profitable refinery hydrocarbon pools. Hydrocarbon boiling above the selective hydrotreating feedstock boiling range are limited in gasoline by the presence of gasoline endpoint specifications. The selective hydrotreating feedstock can and generally comprises cracked naphtha.

Cracked naphtha feedstock can comprise fluid catalytic cracking unit naphtha (FCC catalytic naphtha), coker naphtha, hydrocracker naphtha, resid hydrotreater naphtha, debutanized natural gasoline (DNG), and gasoline blending components from other sources wherein a naphtha boiling range stream can be produced. FCC catalytic naphtha and coker naphtha are generally the most olefinic naphthas since they are products of catalytic or thermal cracking reactions, and are the more preferred streams for use in the selective hydrotreating process of the present invention. FCC catalytic naphtha is more commonly treated with selective hydrogenation than coker naphtha since it has a substantially higher octane, ranging from about 85 to about 95 (Research+Motor Octane)/2, than coker naphtha which ranges from about 50 to about 70 (Research+Motor Octane)/2. Coker naphtha can alternatively be desulfurized and upgraded through catalytic reforming to aromatics, wherein the octane can be substantially enhanced.

The selective hydrotreating feedstock can also comprise low and high sulfur virgin naphtha (virgin naphtha) comprising a substantial portion of normal pentane and hexane for subsequent octane upgrading in an isomerization process. The process and catalyst of the present invention provide substantial saturation of dienes present in the isomerization process feedstock, to mono-olefins. High concentrations of dienes are also adverse to isomerization processes where they can polymerize and form coke on the catalyst, thereby causing catalyst deactivation. Since isomerization processes generally, and more favorably process paraffinic feedstocks, it may be desirable to provide a paraffin from olefin separation step after selective hydrotreating and prior to isomerization or, alternatively, process virgin naphtha in a separate reactor from the cracked naphtha.

The selective hydrotreating feedstock can also be supplemented with distillate streams boiling in a range from about 150° F. to about 700° F. to form a combined selective hydrotreating feedstock. In particular, fluid catalytic cracking unit light catalytic cycle oil (LCCO), and coker still distillate (CSD) can supplement cracked naphtha as part of a combined selective hydrotreating feedstock. Combining LCCO and CSD with cracked naphtha can be achieved, in many cases, by not fractionating the distillate streams from the cracked naphtha at the respective source refining units. In this manner, a refiner can save the capital costs of erecting multiple redundant hydrotreating facilities, and still fractionate distillate from cracked naphtha downstream of the selective hydrotreating process.

The cracked naphtha feedstock generally contains not only paraffins, naphthenes, and aromatics, but also unsaturates, such as open-chain and cyclic olefins, dienes, and cyclic hydrocarbons with olefinic side chains.

The cracked naphtha feedstock generally comprises an overall olefins concentration ranging as high as about 60 wt %, more typically as high as about 50 wt %, and most typically from about 5 wt % to about 40 wt %. The cracked naphtha feedstock can comprise a diene concentration of as much as 15 wt %, but more typically ranges from about 0.1 wt % to about 5 wt % of the feedstock. High diene concentrations can result in a gasoline product with poor stability and color.

The cracked naphtha feedstock sulfur and nitrogen concentration is generally a function of the high and low sulfur crude mix, the hydrogenation capacity of a refinery per barrel of crude capacity, and the alternative dispositions of the particular cracked naphtha components. The higher sulfur cracked naphtha feedstock components are generally derived from coking processes whereby the coker feedstock can comprise high sulfur residual feedstocks and FCC processes, especially processes that do not process hydrotreated feedstocks. The cracked naphtha feedstock sulfur content can generally range from about 0.05 wt % to about 1.0 wt % and more typically from about 0.1 wt % to about 0.5 wt % of the feedstock. The cracked naphtha feedstock nitrogen concentration can generally range from about 5 ppm to about 150 ppm, and more typically from about 20 ppm to about 100 ppm.

The selective hydrotreating process of the present invention generally begins with a cracked naphtha feedstock preheating step. The feedstock is preheated in feed/effluent heat exchangers prior to entering a furnace for final preheating to a targeted reaction zone inlet temperature. Additional preheat and resultant energy savings can be gained by reducing or eliminating cracked naphtha feedstock cooling steps performed at the refinery processing facilities supplying the feedstock components. The feedstock can be contacted with a hydrogen stream prior to, during, and/or after preheating. The hydrogen-containing stream can also be added in the hydrogenation reaction zone.

The hydrogen stream can be pure hydrogen or can be in admixture with diluents such as hydrocarbon, carbon monoxide, carbon dioxide, nitrogen, water, sulfur compounds, and the like. The hydrogen stream purity should be at least about 50% by volume hydrogen, preferably at least about 65% by volume hydrogen, and more preferably at least about 75% by volume hydrogen for best results. Hydrogen can be supplied from a hydrogen plant, a catalytic reforming facility, or other hydrogen producing processes.

The reaction zone can consist of one or more fixed bed reactors and can comprise a plurality of catalyst beds. Since some olefin saturation will take place and olefin saturation and the desulfurization reaction are generally exothermic, interstage cooling, consisting of heat transfer devices between fixed bed reactors or between catalyst beds in the same reactor shell, can be employed. At least a portion of the heat generated from the selective hydrotreating process can often be profitably recovered for use in the hydrotreating process. Where this heat recovery option is not available, cooling may be performed through cooling utilities such as cooling water or air or through use of a hydrogen quench stream. In this manner, optimum reaction temperatures can be more easily maintained.

The reaction zone effluent is generally cooled and the effluent stream is directed to a separator device to remove the hydrogen. Some of the recovered hydrogen can be recycled back to the process while some of the hydrogen can be purged to external systems such as plant or refinery fuel. The hydrogen purge rate is often controlled to maintain a minimum hydrogen purity and remove hydrogen sulfide. Recycled hydrogen is compressed, supplemented with "make up" hydrogen, and reinjected into the process for further hydrotreating.

The separator device liquid effluent can then be processed in a stripper device where light hydrocarbons and hydrogen sulfide can be removed and directed to more appropriate hydrocarbon pools. The stripper liquid effluent product is then generally conveyed to blending facilities for production of finished gasoline products.

Operating conditions to be used in the selective hydrotreating process of the present invention include an average reaction zone temperature of from about 300° F. to about 750° F., preferably from about 400° F. to about 650° F., and most preferably from about 425° F. to about 625° F. for best results. Reaction temperatures below these ranges can result in less effective selective hydrotreating. Excessively high temperatures can increase olefin saturation, catalyst deactivation rates, and energy costs.

Reaction zone pressures will generally range from about 50 psig to about 600 psig, more preferably from about 100 psig to about 500 psig, and most preferably from about 150 psig to about 400 psig for best results. Hydrogen circulation rates will generally range from about 200 SCF/Bbl to about 5,000 SCF/Bbl, preferably from about 200 SCF/Bbl to about 2,500 SCF/Bbl, and most preferably from about 200 SCF/Bbl to about 1,500 SCF/Bbl for best results. Reaction pressures and hydrogen circulation rates below these ranges can result in higher catalyst deactivation rates resulting in less effective selective hydrotreating. Excessively high reaction pressures increase energy and equipment costs and provide diminishing marginal benefits.

The process of the present invention generally operates at a liquid hourly space velocity of from about 0.5 $hr^{-1}$ to about 15.0 $hr^{-1}$, preferably from about 0.5 $hr^{-1}$ to about 10.0 $hr^{-1}$, and most preferably from about 1.0 $hr^{-1}$ to about 5.0 $hr^{-1}$ for best results. Excessively high space velocities can result in less effective selective hydrotreating.

The process and catalyst of the present invention comprise a catalyst having a hydrogenation component and a catalyst support.

The catalyst support component that is employed in the process and catalyst of the present invention generally comprises a weakly acidic refractory inorganic oxide comprising a magnesium component and an alkali metal. The refractory inorganic oxide can be, but is not limited to catalytically active alumina, silica, and mixtures of silica and alumina with the preferred refractory inorganic oxide being catalytically active alumina. The catalytically active alumina can be gamma alumina, eta alumina, theta alumina, boehmite, or mixtures thereof with the preferred catalytically active alumina being gamma alumina. The alumina will generally have an average pore diameter ranging from about 30 Angstroms to about 120 Angstroms, preferably from about 35 Angstroms to about 100 Angstroms, and more preferably from about 35 Angstroms to about 80 Angstroms for best results. The pore volume of the alumina will generally range from about 0.2 cc/g to about 0.8 cc/g, preferably from about 0.2 cc/g to about 0.7 cc/g, and more preferably from about 0.3 cc/g to about 0.7 cc/g for best results. In addition, suitable catalytically active aluminas will have surface areas that are at least 150 $m^2/g$, preferably at least 200 $m^2/g$, and more preferably at least 225 $m^2/g$ for best results.

The hydrogenation component of the catalyst comprises a Group VIB metal and a Group VIII metal of the Periodic Table of Elements. The Group VIB metals suitable for use in the present invention include chromium, molybdenum and tungsten. The preferred Group VIB metals are molybdenum and tungsten, and preferably molybdenum. The Group VIII metals suitable for use in the present invention include iron, cobalt, nickel, ruthenium, rhodium, palladium, osmium, iridium, and platinum. The preferred Group VIII metals are cobalt and nickel, preferably cobalt. These metals can be present in the catalyst in their elemental form or as their oxides, sulfides, or mixtures thereof. The Group VIB metal employed in the present invention is present in an amount ranging from about 4.0 wt % to about 20.0 wt %, preferably from about 4.0 wt % to about 15 wt %, and most preferably from about 4.0 wt % to about 10 wt % based on the total weight of the catalyst and being calculated as oxide. The Group VIII metal employed in the process and catalyst of the present invention is present in an amount ranging from about 0.5 wt % to about 10.0 wt %, preferably from about 0.5 wt % to about 5 wt %, and most preferably from about 0.5 wt % to about 3 wt % based on the total weight of the catalyst and calculated as oxide. Hydrogenation component concentrations below the ranges described above, or absent either of the two hydrogenation components, can provide less effective selective hydrotreating. Hydrogenation component concentrations in excess of the ranges described above can provide diminishing marginal benefits.

The hydrogenation component metals can be deposed or incorporated upon the support by impregnation employing heat-decomposable salts of the Group VIB and VIII metals or other methods known to those skilled in the art such as ion-exchange, with impregnation methods being preferred. Suitable aqueous impregnation solutions include, but are not limited to cobalt nitrate, ammonium molybdate, nickel nitrate, and ammonium meta-tungstate.

Impregnation of the hydrogenation metals on the catalyst support using the above aqueous impregnation solutions can be performed using incipient wetness techniques. The catalyst support is precalcined and the amount of water to be added to just wet all of the support is determined. The aqueous impregnation solutions are then dissolved in the predetermined amount of water and added to the support such that the solution completely saturates the support. The aqueous impregnation solutions are added such that the aqueous solution contains the total amount of hydrogenation component metal(s) to be deposited on the given mass of support. Impregnation can be performed for each metal separately, including an intervening drying step between impregnations, or as a single co-impregnation step. The saturated support can then be separated, drained, and dried in preparation for calcining. Calcination generally is performed at a temperature of from about 482° F. to about 1,202° F., or more preferably from about 977° F. to about 1,067° F.

The catalyst support suitable for use in the process and catalyst of the present invention further comprises a magnesium component. The magnesium component is generally present in the catalyst as an oxide, sulfide, or a mixture thereof. The catalyst support comprises from about 0.5 wt % to about 50 wt % magnesium oxide, from about 0.5 wt % to about 10 wt % magnesium oxide, preferably from about 0.5 wt % to about 5 wt % magnesium oxide, and more preferably from about 0.5 wt % to about 2 wt % magnesium oxide, based on the total weight of the catalyst and being calculated as oxide. Magnesium oxide concentrations below the ranges described above can provide less effective selective hydrotreating. Magnesium oxide concentrations in excess of the ranges described above can result in a selective desulfurization catalyst having reduced crush strength, higher catalyst abrasion losses, and lower surface area.

Impregnation of the magnesium oxide on the catalyst support is performed in a manner similar to that described for impregnation of the hydrogenation metals. A suitable magnesium-containing aqueous impregnation solution is magnesium nitrate. After impregnation, the mixture of particulate and aqueous impregnation solution can be cold-rolled and hot-rolled to provide more uniform distribution of the magnesium component on the catalyst. The catalyst is subsequently dried and calcined in accordance with the methods described above.

The catalyst support suitable for use in the process and catalyst of the present invention further comprises an alkali metal component. Alkali metal components suitable for use in the present invention include lithium, sodium, potassium, and cesium. The preferred alkali metals are sodium, potassium, or lithium, and more preferably sodium for best results. The alkali metal is generally present in the catalyst as an oxide, sulfide, or mixture thereof. The catalyst support comprises from about 0.02 wt % to about 10 wt % alkali metal oxide, preferably from about 0.1 wt % to about 5 wt % alkali metal oxide, more preferably from about 0.2 wt % to about 1 wt % alkali metal oxide, and most preferably from about 0.2 wt % to about 0.5 wt % alkali metal oxide, based on the total catalyst weight, for best results. Alkali metal (sodium, for example) concentrations below the ranges described above can provides less effective selective hydrotreating. Alkali metal concentrations in excess of the ranges described above provide diminishing marginal benefits.

The alkali metal component metals can be deposed or incorporated upon the support by employing a refractory inorganic oxide support component having the alkali metal pre-incorporated, employing a refractory inorganic oxide support component whereby the alkali metal is present in the inorganic oxide prior to formation such as in an impurity or ingredient form as in alumina for use in the manufacture of Claus alumina, or by methods similar to that described for impregnation of the hydrogenation metals. A suitable commercial refractory inorganic oxide having sodium in the form of a catalyst ingredient is DD-431 calcined alumina spheres (1/16 inch) containing about 0.35 wt % sodium, manufactured by Discovery Chemicals, Inc. A suitable commercial refractory inorganic oxide useful for impregnation with an alkali metal is Versal alumina 150 manufactured by LaRoche Chemicals. For purpose of the present invention, a refractory inorganic oxide support component having minimal alkali metal is one whereby the alkali metal comprises less than 500 ppm of the refractory inorganic oxide. Suitable alkali metal-containing aqueous impregnation solutions for utilizing impregnation techniques to incorporate the alkali metal include, but are not limited to the hydroxides, sulfates, and nitrates of sodium and lithium.

The finished selective hydrotreating catalyst suitable for use in the present invention can be in the form of a powder, pills or pellets, extrudates, or spheres. The selective hydrotreating catalyst particle diameter can range from about 1/32 inches to about ¼ inches and more preferably from about 1/20 inches to about ⅛ inches for best results.

It has now been found that the method of preparation of the selective hydrotreating catalyst composition of the present invention can improve selective hydrotreating performance over substantially similar compositions prepared by other methods.

The preferred selective hydrotreating catalyst is manufactured by preparing an aqueous impregnation composition of the Group VIB and Group VIII metal compounds. The Group VIB and Group VIII metal compound concentrations in the aqueous composition are predetermined to meet the particularly targeted catalyst metals concentrations. The amount of water to be used in formulating the aqueous composition can be determined using the incipient wetness techniques described above. The aqueous composition is mixed with the predetermined amount of the refractory inorganic oxide, mixed to a paste-like consistency, and dried.

The dried paste-like material is mulled in a mixer and water added in preparation for formation of particulates in the form of pills, powder, pellets, or extrudates. The preferred catalyst is extruded into extrudates, dried, and calcined in accordance with the principles described herein.

A second aqueous impregnation composition is prepared comprising the magnesium component and the alkali metal component in predetermined amounts to meet the particularly targeted catalyst magnesium and sodium concentrations. The amount of water to be used in formulating the second aqueous composition can be determined using incipient wetness techniques. The second aqueous composition is mixed with the calcined particles described above, dried, and calcined into an embodiment of the selective hydrotreating catalyst of the present invention.

While not wishing to be bound to any particular theory, it is believed that better dispersion of the Group VIB and Group VIII metals contributes to the superior performance of selective hydrotreating catalysts manufactured in accordance with the present invention and prepared by the above described method. Improved dispersion of the Group VIB and Group VIII metals can result in a reduction in the number of acid sites to be neutralized by the magnesium and alkali metal components. Post-impregnation of the magnesium and alkali metal components may provide for the most effective and efficient utilization of the magnesium and alkali metal components for effecting neutralization of the acid sites. The above factors may also partly explain how and why the selective hydrotreating catalyst of the present invention outperforms prior art catalysts utilizing only a small fraction of the magnesium component used in these prior art catalysts.

Catalyst produced in accordance with the present invention is generally durable and resilient to conditions encountered in typical petroleum refineries. Catalyst durability is commonly measured by crush strength and abrasion loss. The crushing strength of the catalyst can be determined by placing a catalyst pill on its side between two parallel, horizontal flat plates, one stationary and one movable. A gradually increasing force is generally applied to the movable plate, perpendicular to the surface of the plate, until the pill breaks. The crushing strength is the force, in pounds per cylinder extrudate, applied at the instant of pill breakage. The reported crushing strength is generally the average value determined over 100 pills. The selective hydrotreating catalyst of the present invention should have a crush strength for cylinder extrudate particle diameters of 1/16 inches, of greater than 6 pounds, preferably greater than 7 pounds, and more preferably greater than 8 pounds for best results. High catalyst crush strengths can reduce catalyst attrition and replacement costs.

Catalyst abrasion loss can be determined by loading 100 grams of pelleted catalyst into a metal cylinder, 10 inches in diameter and 6 inches high which contains one radial baffle 5½ inches long that extends 2 inches from the side toward the axis of the cylinder. The cover is generally replaced and the cylinder rotated horizontally on its axis at 60 RPM for 30 minutes. At the end of the test, the catalyst charge is generally sieved through a 20 mesh screen and that which remains on the screen is weighed. The difference between this weight (in grams) and the original 100 grams is reported as wt % loss by abrasion. The selective hydrotreating catalyst of the present invention should have an abrasion loss of less than 7 percent, preferably less than 4 percent, and more preferably less than 2 percent for best results. High catalyst abrasion loss can also increase catalyst replacement costs and increase the pressure drop across fixed bed reactors.

Combining a Group VIB and Group VIII metal and a non-acidic support having a magnesium component and an alkali metal, in the manner described in the present invention, provides superior catalyst and process performance. While not wishing to be bound to any particular theory, this is believed to be true since cracked naphtha hydrotreating selectivity appears to correlate inversely to catalyst acidity. Addition of a magnesium component and an alkali metal as described in the present invention increases the basicity of the catalyst resulting in reduced olefin saturation and higher desulfurization to olefin saturation selectivity. This superior selective hydrotreating performance is achieved at substantially lower magnesium concentrations. Moreover, the selective hydrotreating process and catalyst containing both a magnesium component and an alkali metal provide superior results to catalysts and processes having either component separately.

The selective hydrotreating process and catalyst of the present invention provide superior desulfurization performance, permitting attainment of cracked naphtha sulfur levels of less than 0.20 wt %, less than 0.10 wt %, and even below 0.05 wt % elemental sulfur. Overall desulfurization levels, calculated as the difference in the wt % sulfur in the product subtracted from the wt % sulfur in the feed, divided by the wt % sulfur in the feed, can reach levels exceeding 50 percent, 75 percent, and levels exceeding 90 percent desulfurization. Desulfurization levels can be routinely adjusted depending on the cracked naphtha product sulfur level necessary to meet gasoline product specifications and the sulfur concentration of the cracked naphtha feedstock. This level of desulfurization performance can make a substantial impact in meeting current and future gasoline sulfur concentration targets.

The selective hydrotreating process and catalyst of the present invention provide superior desulfurization performance while minimizing olefin saturation, promoting hydroisomerization, and minimizing loss of gasoline octane. At desulfurization levels of 75 percent, olefin saturation levels, calculated as the difference in the product bromine number subtracted from the feed bromine number, divided by the feed bromine number, can be maintained below 25 percent, below 20 percent, and at levels below 15 percent. Comparable prior art and commercial processes generally achieve levels exceeding 20 percent and more typically exceeding 30 percent olefin saturation at desulfurization levels of 75 percent. Similarly, the process and catalyst of the present invention achieve octane reductions ((Research+Motor Octane)/2) at 75 percent desulfurization levels, of less than 2.5, less than 1.9, and less than 1.5. This low level of octane loss at the aforementioned desulfurization standards, can substantially minimize the cost of meeting current and future gasoline sulfur concentration targets.

The selective hydrotreating process and catalyst of the present invention generally achieve a substantial reduction in cracked naphtha product diene concentration. Dienes can contribute to downstream process catalyst deactivation where the catalyst of the present invention is utilized for upstream hydrotreating in catalytic processes such as pentane and hexane isomerization. Dienes can also adversely affect gasoline product stability and color. The process and catalyst of the present invention can achieve diene values (Maleic Anhydride Value) of less than 1, less than 0.5, and generally less than 0.1, depending on the level of dienes in the feedstock.

The selective hydrotreating process and catalyst of the present invention generally improve the stability and color of the cracked naphtha product, resulting in a refinery gasoline product having improved overall color and stability. The process and catalyst of the present invention can provide gasoline product stabilities, as measured by test method ASTM D525, of over 600 minutes, over 800 minutes, and generally over 1,000 minutes, depending on the stability level of the feedstock. Cracked naphtha color (often yellow/orange) is also generally improved by the process and catalyst of the present invention. Improved cracked naphtha color and the attendant finished gasoline product color can be particularly beneficial in gasoline marketing regions wherein the gasoline is sold as "water white" or undyed.

The selective hydrotreating catalyst of the present invention is generally more durable than higher selectivity prior art catalysts utilizing a substantial amount of magnesium. The catalyst of the present invention has a substantially higher crushing strength than high selectivity prior art catalysts, and a comparable crushing strength to low selectivity commercially available catalysts. The catalyst of the present invention has a substantially lower abrasion loss level than both high selectivity prior art catalysts and lower selectivity commercially available catalysts. Improved catalyst durability can reduce catalyst replacement costs.

The selective hydrotreating catalyst of the present invention has a substantially higher surface area than higher selectivity prior art catalysts and a comparable surface area to low selectivity commercially available catalysts. The high catalyst surface area generally leads to extended catalyst life and lower catalyst replacement costs.

The method of selective hydrotreating catalyst preparation of the present invention and processes for using catalysts made from this method provide reduced cracked naphtha octane loss at comparable desulfurization levels, compared to catalysts having similar compositions but prepared utilizing other techniques. Catalysts prepared utilizing the method of the present invention generally achieve octane reductions ((Research + Motor Octane)/2) at from about 65 to about 75 percent desulfurization levels, of less than 1.5, less than 1.10, and even less than 0.90. This low level of octane loss at the aforementioned desulfurization standards, can substantially minimize the cost of meeting current and future gasoline sulfur concentration targets.

The present invention is described in further detail in connection with the following examples, it being understood that the same are for purposes of illustration and not limitation.

EXAMPLE 1

An embodiment of the selective hydrotreating catalyst of the present invention was prepared by impregnating 300 grams of commercially available Discovery DD-431 calcined alumina spheres (1/16 inch) containing sodium, with a solution of 11.7 grams of cobalt nitrate, 22.1 grams of ammonium molybdate, and 176.1 grams of water. The wet impregnation technique was carried out by cold-rolling the mixture for 30 minutes followed by hot-rolling the mixture under a heat lamp for 3 hours until the surface was dry. The catalyst was dried at 250° F. for 12 hours and calcined at 1,000° F. for 2 hours.

The particulate above (100 grams) was impregnated with 6.37 grams of $Mg(NO_3)_2.6H_2O$ and 58.7 grams of water. The mixture was cold-rolled for 30 minutes and hot-rolled under a heat lamp for 30 minutes until the surface was dry. The catalyst was dried at 250° F. for 4 hours and calcined at 1,000° F. for 2 hours. The catalyst was designated as Catalyst 1 and the composition and the properties of the catalyst are specified in Table I.

EXAMPLE 2

A selective hydrotreating catalyst was prepared in a manner similar to that described in Example 1. In Example 2, 300 grams of commercially available Versal 150 calcined alumina extrudates (1/16 inch) having minimal sodium were impregnated with a solution of 11.7 grams of cobalt nitrate, 22.1 grams of ammonium molybdate, and 176.1 grams of water. The wet impregnation technique was carried out by cold-rolling the mixture for 30 minutes followed by hot-rolling the mixture under a heat lamp for 3 hours until the surface was dry. The catalyst was dried at 250° F. for 12 hours and calcined at 1,000° F. for 3 hours.

The particulate above (100 grams) was impregnated with 6.37 grams of $Mg(NO_3)_2.6H_2O$ and 58.7 grams of water. The mixture was mixed periodically at room temperature for a period of 7 hours. The catalyst was dried at 250° F. for 4 hours and calcined at 1,000° F. for 3 hours. The catalyst was designated as Catalyst 2 and the composition and the properties of the catalyst are specified in Table 1.

EXAMPLE 3

A selective hydrotreating catalyst was prepared in a manner similar to that described in Example 2. In Example 3, 300 grams of commercially available Versal 150 calcined alumina extrudates (1/16 inch) having minimal sodium were impregnated with a solution of 11.7 grams of cobalt nitrate, 22.1 grams of ammonium molybdate, and 176.1 grams of water. The wet impregnation technique was carried out by cold-rolling the mixture for 30 minutes followed by hot-rolling the mixture under a heat lamp for 3 hours until the surface was dry. The catalyst was dried at 250° F. for 12 hours and calcined at 1,000° F. for 3 hours.

The particulate above (100 grams) was impregnated with 63.7 grams of $Mg(NO_3)_2.6H_2O$ and 112.0 grams of water in a manner so as to form a catalyst having about 8.62 wt % magnesium calculated as an oxide and based on the total weight of the catalyst. The mixture was mixed periodically at room temperature for a period of 7 hours. The catalyst was dried at 250° F. for 12 hours and calcined at 1,000° F. for 3 hours. The catalyst was designated as Catalyst 3 and the composition and the properties of the catalyst are specified in Table I.

EXAMPLE 4

A selective hydrotreating catalyst was prepared in a manner similar to that described in Example 2. In Example 4, 300 grams of commercially available Versal 150 calcined alumina extrudates (1/16 inch) having minimal sodium were impregnated with a solution of 11.7 grams of cobalt nitrate, 22.1 grams of ammonium molybdate, and 176.1 grams of water. The wet impregnation technique was carried out by cold-rolling the mixture for 30 minutes followed by hot-rolling the mixture under a heat lamp for 3 hours until the surface was dry. The catalyst was dried at 250° F. for 12 hours and calcined at 1,000° F. for 3 hours.

The particulate above (100 grams) was impregnated with 6.76 grams of sodium hydroxide and 112.0 grams of water in a manner so as to form a catalyst having about 4.49 wt % sodium calculated as an oxide and based on the total weight of the catalyst. The mixture was mixed periodically at room temperature for a period of 24 hours. The catalyst was dried at 250° F. for 12 hours and calcined at 1,000° F. for 3 hours. The catalyst was designated as Catalyst 4 and the composition and the properties of the catalyst are specified in Table I.

EXAMPLE 5

A selective hydrotreating catalyst was prepared in a manner similar to that described in Example 1. In Example 5, 300 grams of commercially available Discovery DD-431 calcined alumina spheres (1/16 inch) containing sodium were impregnated with a solution of 11.7 grams of cobalt nitrate, 22.1 grams of ammonium molybdate, and 176.1 grams of water. The wet impregnation technique was carried out by cold-rolling the mixture for 30 minutes followed by hot-rolling the mixture under a heat lamp for 3 hours until the surface was dry. The catalyst was dried at 250° F. for 12 hours and calcined at 1,000° F. for 2 hours. The catalyst was designated as Catalyst 5 and the composition and the properties of the catalyst are specified in Table I.

EXAMPLE 6

A prior art hydrotreating catalyst, disclosed in U.S. Pat. No. 4,203,829 to Bertolacini was prepared for use in comparison with the selective hydrotreating catalyst of the present invention. The catalyst was produced in a manner similar to that described in Example 1 of U.S. Pat. No. 4,203,829, which is hereby incorporated by reference. The hydrotreating catalyst comprised cobalt and molybdenum on a support substantially comprising magnesium with a minimal amount of sodium. The catalyst was designated as Catalyst 6 and the composition and the properties of the catalyst are specified in Table I.

EXAMPLE 7

A commercially available hydrotreating catalyst was obtained for use in comparison with the selective hydrotreating catalyst of the present invention. The catalyst was KF-742, manufactured by Akzo and comprises cobalt and molybdenum on a support substantially comprising alumina. The catalyst was designated as Catalyst 7 and the composition and the properties of the catalyst are specified in Table I.

TABLE II-continued

| FEEDSTOCK PROPERTIES-CATALYSTS 1-7 | |
|---|---|
| MOTOR OCTANE | 81.8 |
| (RESEARCH & MOTOR)/2 | 88.3 |
| DISTILLATION, VOL., °F. (ASTM D86) | |
| IBP | 252.5 |
| 5 | 281.0 |
| 10 | 288.5 |
| 20 | 297.0 |
| 30 | 307.5 |
| 40 | 317.0 |
| 50 | 330.0 |
| 60 | 342.5 |
| 70 | 357.0 |
| 80 | 374.0 |
| 90 | 393.0 |
| 95 | 410.5 |
| FBP | 432.5 |

TABLE I

CATALYST COMPOSITION AND PROPERTIES

| CATALYST COMPOSITION/ PROPERTY | CATALYST | | | | | | |
|---|---|---|---|---|---|---|---|
| | 1 | 2 | 3 | 4 | 5 | 6 | 7 |
| COMPOSITION | | | | | | | |
| CoO, Wt % | 0.92 | 0.89 | 0.78 | 0.84 | 0.94 | 1.10 | 4.04 |
| MoO$_3$, Wt % | 5.38 | 5.29 | 4.40 | 4.94 | 5.43 | 5.70 | 15.10 |
| MgO, Wt % | 0.93 | 0.93 | 8.62 | 0.00 | 0.00 | 90.00 | 0.00 |
| Na$_2$O, Wt % (PPM) | 0.32 | (4) | (4) | 4.49 | 0.33 | 0.00 | 0.12 |
| Al$_2$O$_3$, Wt % | 92.45 | 92.89 | 86.20 | 89.73 | 93.30 | 3.20 | 80.74 |
| TOTAL | 100.00 | 100.00 | 100.00 | 100.00 | 100.00 | 100.00 | 100.00 |
| SURFACE AREA, m$^2$/gm | 268 | 228 | 187 | 213 | 265 | 72 | 264 |
| PORE VOLUME, cc/gm | 0.41 | 0.68 | 0.60 | 0.66 | 0.41 | 0.21 | 0.50 |
| AVERAGE PORE DIAMETER, Å | 46 | 80 | 78 | 82 | 45 | 117 | 76 |
| SHAPE | SPHERICAL | EXTRUDATE | EXTRUDATE | EXTRUDATE | SPHERICAL | PILLS | EXTRUDATE |
| SIZE, in. | 1/16 | 1/16 | 1/16 | 1/16 | 1/16 | 1/8 | 1/16 |
| CRUSHING STRENGTH, lb | 22.0 | 15.8 | 13.0 | 14.1 | 23.0 | 6.6 | 22.3 |
| ABRASION LOSS, % | 1.0 | 2.0 | 2.2 | 2.1 | 0.9 | 7.5 | 2.5 |
| BULK DENSITY, lb/ft$^3$ | 50.3 | 30.3 | 49.2 | 30.8 | 49.5 | 51.0 | 44.0 |

EXAMPLE 8

Catalytic naphtha produced from the fluid catalytic cracking unit at the Amoco Oil Refinery in Yorktown, Va. was obtained for use as feedstock in measuring the hydrotreating performance of Catalysts 1 through 7. The composition and properties of the cracked naphtha feedstock are specified in Table II.

TABLE II

| FEEDSTOCK PROPERTIES-CATALYSTS 1-7 | |
|---|---|
| GRAVITY, API | 41.8 |
| PROPERTY ANALYSIS, WT % | |
| CARBON | 87.54 |
| HYDROGEN | 12.17 |
| SULFUR | 0.21 |
| NITROGEN | 0.08 |
| TOTAL | 100.00 |
| BROMINE NUMBER (ASTM D1159) | 34.7 |
| DIENE VALUE (MALEIC ANHYDRIDE VALUE) | 5.07 |
| FIA, VOL. % (ASTM D1319) | |
| PARAFFINS & NAPHTHENES | 29.5 |
| OLEFINS | 23.5 |
| AROMATICS | 47.0 |
| TOTAL | 100.00 |
| GAS CHROME, VOL. % (HC TYPE ANALYSIS) | |
| PARAFFINS | 5.5 |
| ISOPARAFFINS | 23.1 |
| NAPHTHENES | 21.6 |
| AROMATICS | 49.8 |
| TOTAL | 100.0 |
| RESEARCH OCTANE | 94.8 |

EXAMPLE 9

The cracked naphtha feedstock of Example 8 was hydrotreated using Catalysts 1 through 5 described in Examples 1 through 5 and Table I. Catalyst performance was evaluated using a bench scale, isothermal reactor having a three-quarter inch internal diameter and an axial thermowell. Operation was downflow with once-through hydrogen and oil. Each catalyst was used in the form of 1/16 inch extrudates and each catalyst charge was approximately 20 grams. The catalyst was supported near the center of the reactor on a layer of 3 mm Pyrex glass beads, and a preheat zone of 5 mm beads was provided above the catalyst bed.

Each catalyst was presulfided at atmospheric pressure and at temperatures increasing from about room temperature to NMT 700° F. over a period of 14 hours using a 1.7 volume percent polysulfide solution in virgin distillate (boiling between about 350° F. and 650° F. at atmospheric pressure). Hydrogen was injected throughout the presulfiding process at a flow rate of about 0.5 SCFH.

Operating conditions for the runs were approximately a pressure of 300 psig, a temperature of 600° F., an hourly space velocity (WHSV) of 4.0 hr$^{-1}$, and a hydrogen rate of about 800 SCF/Bbl.

Over each 24 hour period, at least a 6 hour sample of the product was collected in a nitrogen-purged product receptacle. Nitrogen purging was performed to remove hydrogen sulfide. The product was analyzed for sulfur content (elemental) by X-ray fluorescence, for bromine number by ASTM D1159, for FIA by ASTM D1319 (to measure paraffins, naphthenes, olefins, and aromatics), and for research, motor, and (R+M)/2 octane.

Octane loss was calculated for each catalyst by analyzing the feed and product octane sequentially for each catalyst test in order to provide testing standardization. The change in bromine number and FIA olefins was used to measure olefin saturation with the bromine number method being preferred since bromine number analysis is generally a more repeatable and accurate testing method. Catalyst selectivity was calculated for each catalyst according to the following formula:

$$\text{Selectivity} = \ln(X_s)/\ln(X_o)$$

where:
- $X_s$ = Product wt % sulfur/Feed wt % sulfur
- $X_o$ = Product wt % olefin/Feed wt % olefin
  = Product bromine number/Feed bromine number.

The operating conditions, product properties, and performance criteria of Catalysts 1 through 5 described in Examples 1 through 5 are specified in Table III.

A graph of catalyst selectivity and (R+M)/2 octane loss is illustrated as FIG. 1 for each of Catalysts 1 through 7. Catalysts in the upper left quadrant of the Figure are preferred for selective hydrotreating since these catalysts provide high selectivity at minimum octane loss.

Catalyst 1, having 0.32 wt % sodium and 0.93 wt % magnesium oxide along with cobalt and molybdenum on a spherical alumina support, provided superior selectivity (10.7) for cracked naphtha hydrotreating while minimizing olefin saturation, and the lowest (R+M)/2 octane loss (1.4). Catalyst 1 also provided a product having a substantially reduced diene value (Maleic Anhydride Value) of less than 0.1 and a gasoline stability ASTM D-525) of greater than 1,015 minutes. The cracked naphtha was converted from a feedstock "dark orange" in color to a product "water white" in color.

Catalyst 2, having a composition similar to Catalyst 2, but for having only 4 ppm of sodium, had good selectivity (8.2) while providing an (R+M)/2 octane loss of 1.6. The absence of sodium resulted in lower selectivity and a higher (R+M)/2 octane loss than Catalyst 1 having 0.32 wt % sodium. Catalyst 2 also provided a product having a substantially reduced diene value (Maleic Anhydride Value) of less than 0.1. The cracked naphtha was converted from a feedstock "dark orange" in color to a product "water white" in color.

Catalyst 3, having a composition similar to Catalyst 2, but for a substantial increase in magnesium oxide concentration (8.62 wt % as compared to 0.93 wt % for Catalyst 2), had good selectivity (7.1) while providing a fairly high (R+M)/2 octane loss of 2.1. The increase of magnesium to 8.62 wt % from 0.93 wt % in Catalyst 2 (without sodium) did not improve Catalyst 2 selectivity or reduce (R+M)/2 octane loss. Catalyst 3 also provided a product having a substantially reduced diene value (Maleic Anhydride Value) of less than 0.1. The cracked naphtha was converted from a feedstock "dark orange" in color to a product "water white" in color.

Catalyst 4, comprising a composition without magnesium and with substantially more sodium (4.49 wt %), had very good selectivity (8.9) while providing an (R+M)/2 octane loss of 1.8. The addition of larger amounts of sodium than present in Catalysts 1 through 4 and the removal of magnesium provided a catalyst having very good selectivity and reasonable (R+M)/2 octane loss but not as good as Catalyst 1 having modest concentrations of sodium and magnesium. Catalyst 4 also provided a product having a substantially reduced diene value (Maleic Anhydride Value) of less than 0.1. The cracked naphtha was converted from a feedstock "dark orange" in color to a product "water white" in color.

Catalyst 5, comprising a composition similar to Catalyst 4 (without magnesium), but having only 0.33 wt % of sodium as compared to 4.49 wt % for Catalyst 4, had an average selectivity (5.4) and a fairly high (R+M)/2 octane loss of 2.1. The reduction in sodium content over Catalyst 4, in the absence of magnesium, resulted in substantially inferior selectivity and (R+M)/2 octane performance. Catalyst 5 also provided a product having a substantially reduced diene value (Maleic Anhydride Value) of less than 0.1. The cracked naphtha was converted from a feedstock "dark orange" in color to a product "water white" in color.

EXAMPLE 10

The cracked naphtha feedstock of Example 8 was hydrotreated using prior art Catalyst 6 described in Example 6 in a manner similar to that described in Example 9. Catalyst 6 was processed at a temperature of 550° F. ($T_{550}$), 50° F. lower than the temperature utilized for the runs using Catalysts 1 through 5. The operating conditions, product properties, and performance criteria of Catalyst 6 ($T_{550}$) described in Example 6 are specified in Table III and illustrated in FIG. 1.

Catalyst 6 ($T_{550}$) had a considerably lower selectivity (4.4) than Catalysts 1 through 5 and a very low (R+M)/2 octane loss (1.4). While (R+M)/2 octane loss was very low, operation using Catalyst 6 at 550° F. provided reduced hydrotreating which is reflected in the selectivity. Catalyst 6 ($T_{550}$) also provided a product having a substantially reduced gasoline stability (ASTM D-525) of less than 500 minutes compared to Catalyst 1 (greater than 1,015 minutes).

EXAMPLE 11

The cracked naphtha feedstock of Example 8 was hydrotreated using prior art Catalyst 6 described in Example 6 in a manner similar to that described in Example 9. Catalyst 6 was processed at a temperature of 600° F. ($T_{600}$), the temperature utilized for the runs using Catalysts 1 through 5. The operating conditions, product properties, and performance criteria of Catalyst 6 ($T_{600}$) described in Example 6 are specified in Table III and illustrated in FIG. 1.

Catalyst 6 ($T_{600}$) had an improved selectivity (6.6) over Catalyst 6, processed at a reaction temperature of 550° F. but also had a higher (R+M)/2 octane loss (1.9). Catalyst 6 ($T_{600}$) had an undesirably lower selectivity than Catalysts 1 through 4 and a fairly high (R+M)/2 octane loss. While the selectivity improved over the 50° F. increase in reaction temperature, the (R+M)/2 octane loss also increased substantially. Catalyst 6 ($T_{600}$) also provided a product having a substantially reduced gasoline stability (ASTM D-525) of less than 500 minutes compared to Catalyst 1 (greater than 1,015 minutes).

EXAMPLE 12

The cracked naphtha feedstock of Example 8 was hydrotreated using commercially available Catalyst 7 described in Example 7 in a manner similar to that described in Example 9. Catalyst 7 was processed at a temperature of 550° F. ($T_{550}$), 50° F. lower than the temperature utilized for the runs using Catalysts 1 through 5. The operating conditions, product properties, and performance criteria of Catalyst 7 ($T_{550}$) described in Example 7 are specified in Table III and illustrated in FIG. 1.

Catalyst 7 ($T_{550}$) had a substantially lower selectivity (4.2) than Catalysts 1 through 5 and a fairly high (R+M)/2 octane loss of 2.1. Commercially available Catalyst 7 ($T_{550}$) was similarly inferior to prior art Catalyst 6 at reaction temperatures of 550° F. and 600° F.

EXAMPLE 13

The cracked naphtha feedstock of Example 8 was hydrotreated using prior art Catalyst 7 described in Example 7 in a manner similar to that described in Example 9. Catalyst 7 was processed at a temperature of 600° F. ($T_{600}$), the temperature utilized for the runs using Catalysts 1 through 5. The operating conditions, product properties, and performance criteria of Catalyst 7 ($T_{600}$) described in Example 7 are specified in Table III and illustrated in FIG. 1.

Catalyst 7 ($T_{600}$) provided reduced selectivity (2.3) and a higher (R+M)/2 octane loss (3.5) compared to Catalyst 7, processed at a reaction temperature of 550° F. Catalyst 7 ($T_{600}$) had an undesirably lower selectivity than Catalysts 1 through 6 and the highest (R+M)/2 octane loss. Commercially available Catalyst 7 is clearly the least desirable of the hydrogenation catalysts tested.

EXAMPLE 14

An embodiment of the selective hydrotreating catalyst of the present invention was prepared for the purpose of determining whether the method of formulating the catalyst of the present invention effects catalyst performance. The catalyst was formed by first utilizing incipient wetness techniques to determine the amount of water required per gram of alumina for catalyst impregnation. The incipient wetness technique resulted in a finding that 1.42 grams of water was needed per gram of alumina. 1,000 grams of commercially available Versal 150 calcined alumina extrudates, manufactured by LaRoche Chemicals, was impregnated with a solution containing 85.8 grams of ammonium molybdate, 54.4 grams of cobalt nitrate, and 1420.0 grams of water. The paste-like mixture was mixed for 2 hours at room temperature and dried in an oven at 250° F. for 12 hours.

The dried catalyst was mulled in a mixer and water added in preparation for extrusion. The catalyst was extruded using a large extruder to form 1/16 inch extrudates. The extrudates were dried in an oven at 250° F. for 12 hours and calcined at 1,000° F. for 3 hours.

Incipient wetness techniques were again utilized to determine that 0.88 grams of water was needed per gram of catalyst comprising cobalt and molybdenum for the next impregnation step. 30 grams of the catalyst comprising cobalt and molybdenum was impregnated with a solution containing 3.16 grams of magnesium nitrate hexahydrate, 0.33 grams of sodium nitrate, and 26.47 grams of water. The extrudate was mixed for 2 hours at room temperature and dried in an oven at 250° F. for 12 hours. The dried extrudate was calcined at 800° F. for 2 hours. The catalyst was designated as Catalyst 8 and the composition and the properties of the catalyst are specified in Table IV.

TABLE III

| | SELECTIVE HYDROTREATING RESULTS-CATALYSTS 1-7 | | | | | | | | |
|---|---|---|---|---|---|---|---|---|---|
| | CATALYST | | | | | | | | |
| | 1 | 2 | 3 | 4 | 5 | 6 $T_{550}$ | 6 $T_{600}$ | 7 $T_{550}$ | 7 $T_{600}$ |
| OPERATING CONDITIONS | | | | | | | | | |
| PRESSURE, PSIG | 300 | 300 | 300 | 300 | 300 | 300 | 300 | 300 | 300 |
| TEMPERATURE, °F. | 600 | 600 | 600 | 600 | 600 | 550 | 600 | 550 | 600 |
| WHSV, HR$^{-1}$ | 3.9 | 3.9 | 3.9 | 3.9 | 3.9 | 3.9 | 4.0 | 3.9 | 3.9 |
| HYDROGEN, SCF/Bbl | 800 | 800 | 799 | 800 | 801 | 1033 | 1017 | 799 | 799 |
| PRODUCT PROPERTIES | | | | | | | | | |
| SULFUR, WT % (XRF) | 0.051 | 0.065 | 0.069 | 0.108 | 0.045 | 0.097 | 0.050 | 0.044 | 0.013 |
| BROMINE # (ASTM D1159) | 30.4 | 30.2 | 29.8 | 32.3 | 26.0 | 29.0 | 27.5 | 23.9 | 10.3 |
| RESEARCH OCTANE | 94.6 | 95.4 | 94.8 | 95.8 | 93.6 | 92.9 | 92.2 | 94.0 | 92.1 |
| MOTOR OCTANE | 81.4 | 81.9 | 81.5 | 82.1 | 81.1 | 80.9 | 80.5 | 81.4 | 80.5 |
| (RESEARCH + MOTOR)/2 | 88.0 | 88.7 | 88.2 | 89.0 | 87.4 | 86.9 | 86.4 | 87.7 | 86.3 |
| FIA, VOL % (ASTM D1319) | | | | | | | | | |
| PARAFFINS + NAPHTHENES | 35.5 | 42.0 | 43.0 | 30.5 | 37.7 | 32.0 | 35.0 | 39.5 | 49.0 |
| OLEFINS | 16.5 | 8.0 | 8.3 | 16.3 | 12.5 | 15.5 | 15.4 | 13.0 | 3.5 |
| AROMATICS | 48.0 | 50.0 | 48.7 | 53.2 | 49.8 | 52.5 | 49.6 | 47.5 | 47.5 |
| TOTAL | 100.0 | 100.0 | 100.0 | 100.0 | 100.0 | 100.0 | 100.0 | 100.0 | 100.0 |
| DIENE VALUE (MALEILIC ANHYDRIDE VALUE) | <0.10 | <0.10 | <0.10 | <0.10 | <0.10 | | | | |
| GASOLINE STABILIYT, MIN (ASTM 525) | >1015 | | | | | <500 | <500 | | |
| PERFORMANCE CRITERIA | | | | | | | | | |
| % DESULFURIZATION | 75.9 | 69.3 | 67.5 | 49.1 | 78.8 | 54.3 | 76.4 | 79.2 | 93.9 |
| % OLEFIN SATURATION (BROMINE #) | 12.3 | 13.0 | 14.1 | 6.9 | 25.1 | 16.4 | 19.1 | 31.1 | 70.3 |
| % OLEFIN SATURATION (FIA) | 29.9 | 66.0 | 64.7 | 30.6 | 46.8 | 35.4 | 35.8 | 44.7 | 85.1 |
| SELECTIVITY | 10.7 | 8.2 | 7.1 | 8.9 | 5.4 | 4.4 | 6.6 | 4.2 | 2.3 |
| OCTANE LOSS (RES. + MOT.)/2 | 1.4 | 1.6 | 2.1 | 1.8 | 2.1 | 1.4 | 1.9 | 2.1 | 3.5 |

EXAMPLE 15

A hydrotreating catalyst for comparison with Catalyst 8 was prepared by first utilizing incipient wetness techniques to determine the amount of water required per gram of alumina for catalyst impregnation. The incipient wetness technique resulted in a finding that 0.8386 grams of water was needed per gram of alumina. 275 grams of commercially available Versal 150 calcined alumina extrudates was impregnated with a solution containing 33.7 grams of ammonium molybdate, 21.4 grams of cobalt nitrate, and 230.6 grams of water. The paste-like mixture was mixed for 2 hours at room temperature and dried in an oven at 250° F. for 12 hours. The dried extrudate was calcined at 1,000° F. for 3 hours.

Incipient wetness techniques were again utilized to determine that 0.7578 grams of water was needed per gram of catalyst comprising cobalt and molybdenum for the next impregnation step. 30 grams of the catalyst comprising cobalt and molybdenum was impregnated with a solution containing 3.16 grams of magnesium nitrate hexahydrate, 0.33 grams of sodium nitrate, and 22.75 grams of water. The extrudate was mixed for 2 hours at room temperature and dried in an oven at 250° F. for 12 hours. The dried extrudate was calcined at 800° F. for 2 hours. The catalyst was designated as Catalyst 9 and the composition and the properties of the catalyst are specified in Table IV.

EXAMPLE 16

A hydrotreating catalyst for comparison with Catalyst 8 was prepared by first utilizing incipient wetness techniques to determine the amount of water required per gram of alumina for catalyst impregnation. The incipient wetness technique resulted in a finding that 1.625 grams of water was needed per gram of alumina. 150 grams of commercially available PHF calcined alumina extrudates, manufactured by Cyanamid was impregnated with a solution containing 18.4 grams of ammonium molybdate, 11.7 grams of cobalt nitrate, 15.8 grams of magnesium hexahydrate, 1.7 grams of sodium nitrate, and 243.75 grams of water. The paste-like mixture was mixed for 2.5 hours at room temperature and dried in an oven at 250° F. for 12 hours. The dried extrudate was calcined at 800° F. for 3 hours.

Incipient wetness techniques were again utilized to determine that 0.7578 grams of water was needed per gram of catalyst comprising cobalt and molybdenum for the next impregnation step. 30 grams of the catalyst comprising cobalt and molybdenum was impregnated with a solution containing 3.16 grams of magnesium nitrate hexahydrate, 0.33 grams of sodium nitrate, and 22.75 grams of water. The extrudate was mixed for 2 hours at room temperature and dried in an oven at 250° F. for 12 hours.

The dried catalyst was moistened with 128.72 grams of water in preparation for extrusion. The catalyst was extruded using a small extruder to form 1/16 inch extrudates. The extrudates were dried in an oven at 250° F. for 12 hours and calcined at 1,000° F. for 3 hours. The catalyst was designated as Catalyst 10 and the composition and the properties of the catalyst are specified in Table IV.

EXAMPLE 17

A hydrotreating catalyst for comparison with Catalyst 8 was prepared by first utilizing incipient wetness techniques to determine the amount of water required per gram of alumina for catalyst impregnation. The catalyst was formed by first utilizing incipient wetness techniques to determine the amount of water required per gram of alumina for catalyst impregnation. The incipient wetness technique resulted in a finding that 1.42 grams of water was needed per gram of alumina. 1,000 grams of commercially available Versal 150 calcined alumina extrudates was impregnated with a solution containing 85.8 grams of ammonium molybdate, 54.4 grams of cobalt nitrate, and 1420.0 grams of water. The paste-like mixture was mixed for 2 hours at room temperature and dried in an oven at 250° F. for 12 hours.

The dried catalyst was mulled in a mixer and water added in preparation for extrusion. The catalyst was extruded using a large extruder to form 1/16 inch extrudates. The extrudates were dried in an oven at 250° F. for 12 hours and calcined at 1,000° F. for 3 hours. The catalyst was designated as Catalyst 11 and the composition and the properties of the catalyst are specified in Table IV.

EXAMPLE 18

A hydrotreating catalyst for comparison with Catalyst 8 was prepared by first utilizing incipient wetness techniques to determine the amount of water required per gram of alumina for catalyst impregnation. The incipient wetness technique resulted in a finding that 0.8836 grams of water was needed per gram of alumina. 275 grams of commercially available Versal 150 calcined alumina extrudates was impregnated with a solution containing 33.7 grams of ammonium molybdate, 21.4 grams of cobalt nitrate, and 230.6 grams of water. The paste-like mixture was mixed for 2 hours at room temperature and dried in an oven at 250° F. for 12 hours. The dried extrudate was calcined at 1,000° F. for 3 hours. The catalyst was designated as Catalyst 12 and the composition and the properties of the catalyst are specified in Table IV.

EXAMPLE 19

A commercially available hydrotreating catalyst was obtained for use in comparison with the selective hydrotreating catalyst of the present invention. The catalyst was NM-477, manufactured by Crosfield and comprises cobalt and molybdenum on a support substantially comprising alumina. The catalyst was designated as Catalyst 13 and the composition and the properties of the catalyst are specified in Table IV.

TABLE IV

| CATALYST COMPOSITION AND PROPERTIES-CATALYST 8-13 | | | | | |
|---|---|---|---|---|---|
| CATALYST COMPOSITION/ PROPERTY | CATALYST | | | | |
| | 8 | 9 | 10 | 11 | 12 | 13 |
| COMPOSITION | | | | | |

TABLE IV-continued
CATALYST COMPOSITION AND PROPERTIES-CATALYST 8-13

| CATALYST COMPOSITION/ PROPERTY | CATALYST | | | | | |
|---|---|---|---|---|---|---|
| | 8 | 9 | 10 | 11 | 12 | 13 |
| CoO, Wt % | 2.00 | 2.00 | 2.00 | 2.00 | 2.00 | 3.30 |
| $MoO_3$, Wt % | 10.00 | 10.00 | 10.00 | 10.00 | 10.00 | 10.00 |
| MgO, Wt % | 1.00 | 1.00 | 1.00 | 0.00 | 0.00 | 0.00 |
| $Na_2O$, Wt % | 0.30 | 0.30 | 0.30 | 0.00 | 0.00 | 0.00 |
| $Al_2O_3$, Wt % | 86.70 | 86.70 | 86.70 | 88.00 | 88.00 | 82.70 |
| TOTAL | 100.00 | 100.00 | 100.00 | 100.00 | 100.00 | 100.00 |
| METHOD OF FORMATION | CO/MO COEXT NA/MG POST IMP | CO/MO/NA/MO POST IMP | CO/MO/NA/MO COEXT | CO/MO COEXT | CO/MO POST IMP | |
| SURFACE AREA, $m^2/gm$ | 282 | 221 | 370 | 308 | 232 | 255 |
| PORE VOLUME, cc/gm | 0.58 | 0.61 | 0.34 | 0.61 | 0.63 | 0.46 |
| SHAPE | EXTRUDATE | EXTRUDATE | EXTRUDATE | EXTRUDATE | EXTRUDATE | EXTRUDATE |
| SIZE, in. | 1/16 | 1/16 | 1/16 | 1/16 | 1/16 | 1/16 |
| CRUSHING STRENGTH, lb | 8.3 | 10.6 | 3.3 | 8.6 | 9.4 | 6.8 |
| BULK DENSITY, $lb/ft^3$ | 31.8 | 34.3 | 31.8 | 31.8 | 34.3 | 48.0 |

EXAMPLE 20

Catalytic naphtha produced from the fluid catalytic cracking units at the Amoco Oil Refinery in Whiting, Indiana was fractionated into a heavy catalytic naphtha fraction and a light catalytic naphtha fraction. The heavy catalytic naphtha fraction was utilized as a carrier for a sulfiding agent used to activate Catalysts 7 through 13 in preparation for selective hydrotreating performance testing. The sulfiding agent was tertiary dodecyl polysulfide and was added to the heavy catalytic naphtha at a concentration of about 5 percent by weight. The heavy catalytic naphtha and the sulfiding agent compositions and properties are specified in Table V.

Catalytic naphtha produced from the fluid catalytic cracking unit at the Amoco Oil Refinery in Yorktown, Va. was obtained for use as feedstock in measuring the hydrotreating performance of Catalysts 7 through 13. The composition and properties of the cracked naphtha feedstock are specified in Table V.

TABLE V
FEEDSTOCK PROPERTIES-CATALYSTS 8-13

| | CARRIER NAPHTHA FOR SULFIDING | SULFIDING SOLUTION | HEAVY CATALYTIC NAPHTHA FEEDSTOCK |
|---|---|---|---|
| GRAVITY, API | 31.8 | 30.6 | 45.7 |
| SULFUR, WT % | 0.06 | 1.11 | 0.21 |
| NITROGEN, PPM | 73 | 68 | 65 |
| FIA, VOL % (ASTM D1319) | | | |
| PARRAFFINS & NAPHTHENES | 24 | 24 | 30 |
| OLEFINS | 5 | 8 | 28 |
| AROMATICS | 71 | 68 | 43 |
| TOTAL | 100 | 100 | 100 |
| RESEARCH OCTANE | | | 94.8 |
| MOTOR OCTANE | | | 81.1 |
| (RESEARCH & OCTANE/2 DISTILLATION, | | | 880 |

TABLE V-continued
FEEDSTOCK PROPERTIES-CATALYSTS 8-13

| | CARRIER NAPHTHA FOR SULFIDING | SULFIDING SOLUTION | HEAVY CATALYTIC NAPHTHA FEEDSTOCK |
|---|---|---|---|
| VOL, °F. (ASTM D86) | | | |
| IBP | 352 | 335 | 168 |
| 5 | 363 | 361 | 210 |
| 10 | 367 | 366 | 222 |
| 20 | 373 | 372 | 237 |
| 30 | 376 | 377 | 253 |
| 40 | 381 | 382 | 268 |
| 50 | 387 | 387 | 285 |
| 60 | 390 | 395 | 302 |
| 70 | 399 | 403 | 322 |
| 80 | 409 | 414 | 342 |
| 90 | 423 | 421 | 366 |
| 95 | 436 | 422 | 382 |
| FBP | 447 | 422 | 412 |

EXAMPLE 21

The Yorktown catalytic naphtha feedstock of Example 20 was hydrotreated using Catalysts 7 through 13 described in Examples 14 through 20 and Table IV. Catalyst performance was evaluated using a bench scale, isothermal reactor having a three-quarter inch internal diameter and an axial thermowell. Operation was downflow with once-through hydrogen and oil. Each catalyst was used in the form of 1/16 inch extrudates and each catalyst charge was approximately 20 grams. The catalyst was diluted with an inert low surface area alumina in a ratio of 1:1 by weight in order to improve flow distribution and maintain a better temperature profile through the reactor. The catalyst was supported near the center of the reactor on a layer of 3 mm Pyrex glass beads, and a preheat zone of 5 mm beads was provided above the catalyst bed.

Each catalyst was presulfided at atmospheric pressure and at temperatures increasing from about room temperature to NMT 700° F. over a period of 18 hours using a 5.0 wt % tertiary dodecyl polysulfide solution in heavy catalytic naphtha. The sulfiding solution was maintained at a feed rate of 100 cc/hours while hydrogen was injected throughout the presulfiding process at a flow rate of about 0.5 SCFH.

Operating conditions for the runs were approximately a pressure of 300 psig, a temperature ranging from about 450° F. to about 550° F., an hourly space velocity (WHSV) of 3.0 hr$^{-1}$, and a hydrogen rate of about 800 SCF/Bbl.

Over each 24 hour period, at least a 6 hour sample of the product was collected in a nitrogen-purged product receptacle. Nitrogen purging was performed to remove hydrogen sulfide. The product was analyzed for sulfur content (elemental) by X-ray fluorescence, for FIA by ASTM D 1319 (to measure olefin content), and for research, motor, and (RON+MON)/2 octane by near-infrared spectroscopy (NIR).

Octane loss was calculated for each catalyst test in order to provide testing standardization. The change in product from feedstock FIA olefins was used to measure olefin saturation. The operating conditions, product properties, and performance criteria of Catalysts 8 through 12 described in Examples 14 through 18, are specified in Table VI. The operating conditions, product properties, and performance criteria of commercial Catalysts 7 and 13 described in Examples 7 and 19, are specified in Table VII.

A graph of desulfurization and (RON+MON)/2 octane loss is illustrated as FIG. 2 for each of Catalysts 7 through 13. Catalysts in the upper left quadrant of the Figure are preferred for selective hydrotreating since these catalysts provide minimum octane loss at maximum desulfurization levels.

Catalyst 8, having 2.00 wt % cobalt, 10.00 wt % molybdenum, 1.00 wt % magnesium, and 0.30 wt % sodium on an alumina support and prepared by coextrusion of cobalt and molybdenum and post impregnation of magnesium and sodium, provided only 0.85 (RON+MON)/2 octane loss at 66.8 percent desulfurization. This superior performance was achieved at a reaction temperature of 550° F.

Catalyst 9, having a composition similar to Catalyst 8, but manufactured by post impregnation of cobalt, molybdenum, magnesium, and sodium onto the alumina support, provided a larger octane loss of 1.12 (RON+MON)/2 at 69.2 percent desulfurization than Catalyst 8. This performance was achieved at the lower reaction temperature of 500° F.

Catalyst 10, having a composition similar to Catalyst 8, but manufactured by impregnation of cobalt, molybdenum, magnesium, and sodium onto the alumina support and coextrusion, provided a larger octane loss of 1.23 (RON+MON)/2 at 73.0 percent desulfurization than Catalyst 8. This performance was achieved at a reaction temperature of 550° F.

Catalyst 11, having 2.00 wt % cobalt, 10.00 wt % molybdenum, negligible magnesium and sodium, and manufactured by impregnation of the cobalt and molybdenum onto the alumina support and coextrusion, provided a larger octane loss of 1.28 (RON+MON)/2 at 70.1 percent desulfurization than Catalyst 8. This performance was achieved at a reaction temperature of 550° F.

Catalyst 12, having 2.00 wt % cobalt, 10.00 wt % molybdenum, negligible magnesium and sodium, and manufactured by post impregnation of the cobalt and molybdenum onto the alumina extrudate support, provided a larger octane loss of 0.99 (RON+MON)/2 at 70.3 percent desulfurization than Catalyst 8. This performance was achieved at the lower reaction temperature of 500° F.

Catalyst 7, a commercial catalyst having 4.04 wt % cobalt, 15.10 wt % molybdenum, 0.12 wt % sodium, and negligible magnesium on an alumina support, provided a substantially larger octane loss of 1.26 (RON+MON)/2 at only 57.5 percent desulfurization and 2.27 (RON+MON)/2 at 82.0 percent desulfurization, than Catalyst 8. This performance was achieved at reaction temperatures of 475° F. and 500° F. respectively.

Catalyst 13, a commercial catalyst having 3.30 wt % cobalt, 14.00 wt % molybdenum, and negligible amounts of magnesium and sodium on an alumina support, provided a substantially larger octane loss of 1.83 (RON+MON)/2 at 76.6 percent desulfurization, than Catalyst 8. This performance was achieved at a reaction temperature of 500° F.

TABLE VI

SELECTIVE HYDROTREATING RESULTS-CATALYSTS 8-12

| | CATALYST | | | | | | | | |
|---|---|---|---|---|---|---|---|---|---|
| | 8 T$_{450}$ | 8 T$_{500}$ | 8 T$_{550}$ | 9 T$_{450}$ | 9 T$_{500}$ | 9 T$_{550}$ | 10 T$_{450}$ | 10 T$_{500}$ | 10 T$_{550}$ |
| OPERATING CONDITIONS | | | | | | | | | |
| PRESSURE, PSIG | 300 | 300 | 300 | 300 | 300 | 300 | 300 | 300 | 300 |
| TEMPERATURE, °F. | 450 | 500 | 550 | 450 | 500 | 550 | 450 | 500 | 550 |
| WHSV, HR$^{-1}$ | 3.0 | 3.0 | 3.0 | 3.0 | 3.0 | 3.0 | 3.0 | 3.0 | 3.0 |
| HYDROGEN, SCF/Bbl | 800 | 800 | 800 | 800 | 800 | 800 | 800 | 800 | 800 |
| PRODUCT PROPERTIES | | | | | | | | | |
| SULFUR, WT % (XRF) | 0.192 | 0.123 | 0.070 | 0.156 | 0.065 | 0.010 | 0.178 | 0.122 | 0.057 |
| RESEARCH OCTANE | 95.2 | 94.6 | 94.2 | 94.8 | 93.7 | 90.9 | 95.5 | 94.7 | 92.8 |
| MOTOR OCTANE | 81.6 | 81.4 | 81.1 | 81.4 | 80.9 | 79.8 | 81.5 | 81.1 | 80.5 |
| (RES + MOTOR)/2 | 88.4 | 88.0 | 87.7 | 88.1 | 87.3 | 85.3 | 88.5 | 87.9 | 86.7 |
| FIA. VOL % OLEFINS (ASTM D1319) | 24.3 | 21.3 | 15.3 | 23.0 | 19.5 | 8.8 | 23.5 | 22.0 | 19.0 |
| PERFORMANCE CRITERIA | | | | | | | | | |
| DESULFURIZATION | 9.0 | 42.0 | 66.8 | 26.3 | 69.2 | 95.5 | 14.8 | 41.9 | 73.0 |
| OLEFIN SATURATION (FIA) | 3.0 | 15.0 | 41.3 | 8.0 | 22.0 | 65.0 | 2.1 | 12.0 | 24.0 |
| OCTANE LOSS (RES + MOT)/2 | 0.02 | 0.37 | 0.85 | 0.31 | 1.12 | 3.09 | 0.30 | 0.89 | 1.23 |

| | CATALYST | | | | | |
|---|---|---|---|---|---|---|
| | 11 T$_{450}$ | 11 T$_{500}$ | 11 T$_{550}$ | 12 T$_{450}$ | 12 T$_{500}$ | 12 T$_{550}$ |
| OPERATING CONDITIONS | | | | | | |
| PRESSURE, PSIG | 300 | 300 | 300 | 300 | 300 | 300 |
| TEMPERATURE, °F. | 450 | 500 | 550 | 450 | 500 | 550 |
| WHSV, HR$^{-1}$ | 3.0 | 3.0 | 3.0 | 3.0 | 3.0 | 3.0 |
| HYDROGEN, SCF/Bbl | 800 | 800 | 800 | 800 | 800 | 800 |

TABLE VI-continued

SELECTIVE HYDROTREATING RESULTS-CATALYSTS 8-12

| PRODUCT PROPERTIES | | | | | | |
|---|---|---|---|---|---|---|
| SULFUR, WT % (XRF) | 0.175 | 0.107 | 0.603 | 0.099 | 0.062 | 0.019 |
| RESEARCH OCTANE | 94.6 | 93.8 | 94.2 | 93.9 | 93.5 | 92.2 |
| MOTOR OCTANE | 81.1 | 80.6 | 80.9 | 80.8 | 80.7 | 80.1 |
| (RES + MOTOR)/2 | 87.9 | 87.2 | 87.6 | 87.4 | 87.1 | 86.2 |
| FIA. VOL % OLEFINS (ASTM D1319) | 23.0 | 21.0 | 18.5 | 21.0 | 20.0 | 10.7 |
| PERFORMANCE CRITERIA | | | | | | |
| DESULFURIZATION | 16.5 | 48.8 | 70.1 | 52.6 | 30.3 | 90.9 |
| OLEFIN SATURATION (FIA) | 0.0 | 19.2 | 22.9 | 8.7 | 23.1 | 55.6 |
| OCTANE LOSS (RES + MOT)/2 | 0.21 | 0.82 | 1.28 | 0.70 | 0.99 | 2.61 |

TABLE VII

CATALYST COMPOSITION AND PROPERTIES-COMMERCIAL CATALYST 7 AND 13

| | CATALYST | | | | | |
|---|---|---|---|---|---|---|
| | 7 $T_{450}$ | 7 $T_{475}$ | 7 $T_{500}$ | 13 $T_{450}$ | 13 $T_{475}$ | 13 $T_{500}$ |
| OPERATING CONDITIONS | | | | | | |
| PRESSURE, PSIG | 300 | 300 | 300 | 300 | 300 | 300 |
| TEMPERATURE, °F. | 450 | 475 | 500 | 450 | 475 | 500 |
| WHSV, $HR^{-1}$ | 3.0 | 3.0 | 3.0 | 3.0 | 3.0 | 3.0 |
| HYDROGEN, SCF/BBL | 800 | 800 | 800 | 800 | 800 | 800 |
| PRODUCT PROPERTIES | | | | | | |
| SULFUR, WT % (XRF) | 0.129 | 0.090 | 0.038 | 0.152 | 0.106 | 0.050 |
| RESEARCH OCTANE | 94.1 | 92.7 | 92.1 | 93.5 | 94.3 | 92.1 |
| MOTOR OCTANE | 80.9 | 80.4 | 80.0 | 80.4 | 81.0 | 80.2 |
| (RESEARCH + MOTOR)/2 | 87.5 | 86.6 | 86.1 | 87.0 | 87.7 | 86.1 |
| FIA, VOL % OLEFINS ASTM D 1319) | 19.0 | 17.0 | 11.0 | 19.0 | 20.0 | 14.0 |
| PERFORMANCE CRITERIA | | | | | | |
| % DESULFURIZATION | 39.2 | 57.5 | 82.0 | 28.3 | 50.2 | 76.6 |
| % OLEFIN SATURATION (FIA) | 26.9 | 29.2 | 57.7 | 20.8 | 20.0 | 53.3 |
| OCTANE LOSS (RES + MOT)/2 | 0.85 | 1.26 | 2.27 | 0.81 | 1.22 | 1.83 |

That which is claimed is:

1. A process for the selective desulfurization of a selective hydrotreating feedstock comprising reacting said feedstock with hydrogen at hydrotreating conditions comprising a reaction temperature ranging from about 300° F. to about 750° F. and a reaction pressure ranging from about 50 psig to about 600 psig in the presence of a catalyst comprising a hydrogenation component and a support component, said hydrogenation component comprising a Group VIB metal component and a Group VIII metal component wherein said Group VIB metal component is present in an amount ranging from about 4 wt % to about 20 wt % and the Group VII metal component is present in an amount ranging from about 0.5 wt % to about 1¯ 6, both calculated as oxides and based on the total catalyst weight and said support component comprising from about 0.5 wt % to about 50 wt % of a magnesium component and from about 0.02 wt % to about 10 wt % of an alkali metal component, both calculated as oxides and based on the total catalyst weight.

2. The process of claim 1 where said feedstock consists essentially of material boiling in the range of from about 150° F. to about 450° F.

3. The process of claim 1 where said feedstock comprises at least one member selected from the group consisting of light catalytic cycle oil and coker still distillate.

4. The process of claim 1 wherein said Group VIB metal component is selected from the group consisting of molybdenum and tungsten.

5. The process of claim 1 wherein said Group VII metal component is selected from the group consisting of cobalt and nickel.

6. The process of claim 1 wherein said alkali metal component is sodium and said sodium is present in an amount ranging from about 0.1 wt % to about 5 wt %, calculated as oxide and based on the total catalyst weight.

7. A process for the selective desulfurization of a cracked naphtha feedstock comprising reacting said feedstock with hydrogen at hydrotreating conditions comprising a reaction temperature ranging from about 300° F. to about 750° F. and a reaction pressure ranging from about 50 psig to about 600 psig. in the presence of a catalyst and producing a product, said catalyst comprising a hydrogenation component and a support component, said hydrogenation component comprising a Group VIB metal component and a Group VIII metal component wherein said Group VIB metal component is selected from the group consisting of molybdenum and tungsten and is present in an amount ranging from about 4 wt % to about 10 wt % and said Group VIII metal component is selected from the group consisting of cobalt and nickel and is present in an amount ranging from about 0.5 wt % to about 5 wt %, both calculated as oxides and based on the total catalyst weight and said support component from about 0.5 wt % to about 10 wt % of a magnesium component and from about 0.1 wt % to about 5 wt % of a sodium component, both calculated as oxides and based on the total catalyst weight, said product having reduced sulfur content.

8. The process of claim 7 wherein said Group VIB metal component is molybdenum.

9. The process of claim 7 wherein said Group VIII metal component is cobalt.

10. The process of claim 7 wherein said hydrotreating conditions comprise a temperature of from about 400°

F. to about 650° F., a total pressure of from about 100 psig to about 500 psig, a hydrogen supply rate of from about 200 SCF/Bbl to about 5000 SCF/Bbl of feedstock, and a WHSV of from about 0.5 hr$^{-1}$ to about 15 hr$^{-1}$.

11. The process of claim 7 wherein said magnesium component is present in an amount ranging from about 0.5 wt % to about 2 wt %, calculated as oxide and based on the total catalyst weight.

12. The process of claim 7 wherein said sodium component is present in an amount ranging from about 0.2 wt % to about 1.0 wt %, calculated as oxide and based on the total catalyst weight.

13. The process of claim 7 wherein said catalyst support comprises gamma alumina.

14. The process of claim 7 wherein said gamma alumina is present as substantially spherical gamma alumina comprising from about 0.2 wt % to about 0.5 wt % sodium.

15. The process of claim 7 wherein said catalyst has a surface area of at least 150 m$^2$/gm.

16. The process of claim 7 wherein said product of said selective hydrotreating process has an (R+M)/2 octane not more than 1.9 units below said feedstock at 75 percent desulfurization.

17. The process of claim 7 wherein said product of said selective hydrotreating process has a gasoline stability, as tested under ASTM D525, of greater than 1,000 minutes.

18. The process of claim 7 wherein said product of said selective hydrotreating process has a Maleic Anhydride Value of less than 0.1.

19. A process for the selective desulfurization of a cracked naphtha feedstock comprising reacting said feedstock with hydrogen at hydrotreating conditions comprising a reaction temperature ranging from about 300° F. to about 750° F. and a reaction pressure ranging from about 50 psig to about 600 psig, in the presence of a selective hydrotreating catalyst and producing a product, said selective hydrotreating catalyst comprising a hydrogenation component comprising from about 4 wt % to about 20 wt % of a Group VIB metal component and from about 0.5 wt % to about 10 wt % of a Group VII metal component, both calculated as oxides and based on the total catalyst weight, and a support component comprising from about 0.5 wt % to about 50 wt % of a magnesium component and from about 0.02 wt % to about 10 wt % of an alkali metal component, both calculated as oxides and based on the total weight of the catalyst, wherein said selective hydrotreating catalyst is prepared by a method which comprises:

preparing a first aqueous composition comprising dissolved Group VIB and Group VIII metal compounds;

mixing said first aqueous composition with a refractory inorganic oxide and forming a paste comprising Group VIB and Group VIII metals;

forming said paste into particulate comprising at least one form selected from the group consisting of pills, powder, pellets, and extrudates;

preparing a second aqueous composition comprising dissolved magnesium and alkali metal components;

combining said second aqueous composition with said particulate and producing aqueous particulate; and calcining said aqueous particulate to produce said selective hydrotreating catalyst.

20. The process of claim 19 wherein said forming step comprises extruding said paste into extrudates, said extrudates having a particle diameter ranging from about 1/32 inches to about ¼ inches.

21. The process of claim 19 wherein said Group VIB compound comprises a molybdenum component present in an amount ranging from about 4 percent by weight to about 10 percent by weight, said Group VIII compound comprises a cobalt component present in an amount ranging from about 0.5 percent to about 5.0 wt %, said magnesium component is present in an amount ranging from about 0.5 wt % to about 50.0 wt %, and said alkali metal component comprises a sodium component present in an amount ranging from about 0.1 wt % to about 5.0 wt %, each calculated as a percentage of said selective hydrotreating catalyst.

22. The process of claim 19 wherein said refractory inorganic oxide is alumina.

23. The process of claim 22 wherein said refractory inorganic oxide is substantially spherical gamma alumina comprising from about 0.2 wt % to about 0.5 wt % sodium.

24. The process of claim 23 wherein said second aqueous composition does not contain said alkali metal component.

25. The process of claim 19 wherein said hydrotreating conditions comprise a temperature of from about 400° F. to about 650° F., a total pressure of from about 100 psig to about 500 psig, a hydrogen supply rate of from about 200 SCF/Bbl to about 5000 SCF/Bbl of feedstock, and a WHSV of from about 0.5 hr$^{-1}$ to about 15 hr$^{-1}$.

26. The process of claim 19 wherein said product of said selective hydrotreating process has an (R+M)/2 octane not more than 1.9 units below said feedstock at 75 percent desulfurization.

* * * * *

UNITED STATES PATENT AND TRADEMARK OFFICE
CERTIFICATE OF CORRECTION

PATENT NO. : 5,266,188
DATED : November 30, 1993
INVENTOR(S) : Simon G. Kukes, et al It is certified that error appears in the above-indentified patent and that said Letters Patent is hereby corrected as shown below:

| Col. | Line | |
|------|------|---|
| 15 | 50 | Table II should be deleted and reinserted, beginning at Column 16, line 40 |
| 27 | 49 | reads "0.5 wt % to about 1 %," should read --0.5 wt % to about 10 wt %,-- |

Signed and Sealed this

Sixteenth Day of August, 1994

Attest:

BRUCE LEHMAN

Attesting Officer    Commissioner of Patents and Trademarks